D. C. WOODWORTH.
SPEED VARYING MECHANISM.
APPLICATION FILED OCT. 20, 1913.
1,122,563.
Patented Dec. 29, 1914.
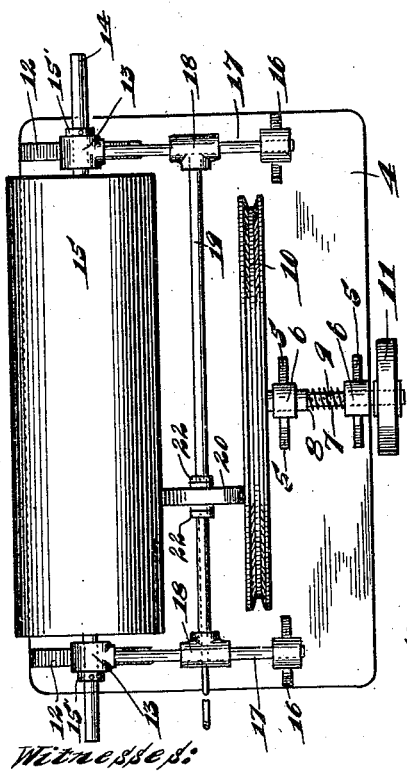
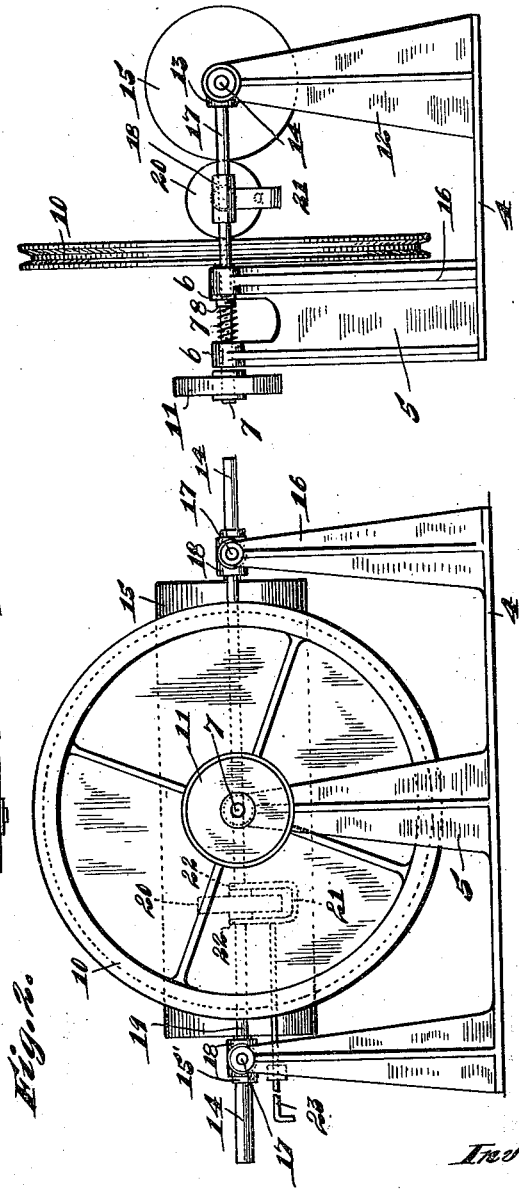
Witnesses:
C. E. Wessels.
T. Colson.
Inventor:
Dallas C. Woodworth,
By Joshua R. H. Potts
his Attorney.

UNITED STATES PATENT OFFICE.

DALLAS C. WOODWORTH, OF ROCK ISLAND, ILLINOIS.

SPEED-VARYING MECHANISM.

1,122,563.  Specification of Letters Patent.  Patented Dec. 29, 1914.

Application filed October 20, 1913. Serial No. 796,218.

*To all whom it may concern:*

Be it known that I, DALLAS C. WOODWORTH, a citizen of the United States, and a resident of the city of Rock Island, county of Rock Island, and State of Illinois, have invented certain new and useful Improvements in Speed-Varying Mechanism, of which the following is a specification.

My invention relates to improvements in speed varying mechanism and has for its object the provision of an improved device of this character which is simple in construction and efficient in use.

The invention consists in the combinations and arrangements of parts hereinafter described and claimed.

The invention will be best understood by reference to the accompanying drawings forming a part of this specification, and in which—

Figure 1 is a side elevation of a device embodying my invention, Fig. 2 is a plan view of the same, and Fig. 3 is an end elevation of the same.

The preferred form of construction as illustrated in the drawings comprises a base member 4 having an upwardly extending arm 5 carrying bearings 6 at its top in which is rotatably mounted a shaft 7. The shaft 7 is provided with a shoulder 8 and a spring 9 around the smaller portion of said shaft and pressing against shoulder 8 and one of bearings 6. On one end of shaft 7 is a friction disk 10 rigidly secured thereto and on the other end thereof is a driving pulley 11 also rigidly secured thereto. There is a small space between the hubs of friction disk 10 and pulley 11 and their respective bearing 6 to permit of slight longitudinal movement of shaft 7. On the base 4 are also arms 12 carrying bearings 13 at their upper ends. Rotatably mounted in the bearings 13 is a shaft 14 carrying a friction wheel 15. The shaft 14 and shaft 7 are disposed substantially in the same plane and shaft 7 is perpendicular to shaft 14, both shafts being disposed horizontally. The shaft 14 carries two set collars 15′ adapted to prevent longitudinal movement thereof. Arms 16 are also carried by base 4 and at their upper ends perforated with guide rods 17 secured in said perforations. The guide rods 17 are disposed horizontally and one end of each secured in a bearing 13. Slidably mounted on the guide rods 17 are supporting members 18 and carried by the supporting members 18 is a rod 19 and a pulley 20 loosely mounted thereon. A U-shaped member 21 is provided with collars 22 at the ends thereof and said collars are disposed at the ends of the hub of pulley 20 and are adapted to control the movement of said pulley longitudinally of rod 19. A rod 23 is secured to U-shaped member 21 and affords a means for moving the U-shaped member longitudinally of rod 19. By this arrangement it will be observed that pulley 20 may be adjusted between friction disk 10 and friction cylinder 15 so as to vary the speed of transmission from one to the other. When the pulley 20 is adjusted to contact with the center of disk 10 no motion will be transmitted, but when said pulley is adjusted to either side of the center of disk 10, motion will be transmitted from one member to the other, but in opposite directions, as will be readily understood. Spring 9 normally presses the disk 10 against pulley 20 and the latter against friction wheel 15. The sliding connection between members 18 and guide rods 17 permitting of lateral movement of rod 19 to permit varying the friction between said members as will be readily understood. The apparatus thus serves as a means not only for varying the speed of transmission but also as a means for reversing the direction of the transmitted motion. The specific arrangement of parts constitutes a simple and efficient one for the purpose.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A speed varying mechanism comprising a base having upstanding bearing members thereon; a shaft journaled in certain of said bearing members and adapted for slight longitudinal movement; a friction disk carried by said shaft; a second shaft mounted in certain of the other of said bearing members; a friction cylinder fixed on said last mentioned shaft; two rods mounted at right angles to said last mentioned shaft; a member slidably mounted on each of said rods; a third rod carried by said members; a pulley rotatably and slidably mounted on said last mentioned rod between said friction disk and friction cylinder; and means loosely maintaining said friction disk, pulley and friction cylinder in operative engagement, substantially as described.

2. A speed varying mechanism comprising a base having upstanding bearing members thereon; a shaft journaled in certain of said bearing members and adapted for slight longitudinal movement; a friction disk carried by said shaft; a second shaft mounted in certain of the other of said bearing members; a friction cylinder fixed on said last mentioned shaft; two rods mounted at right angles to said last mentioned shaft; a member slidably mounted on each of said rods; a third rod carried by said members; a pulley rotatably and slidably mounted on said last mentioned rod between said friction disk and friction cylinder; and a spring on said first mentioned shaft pressing against a portion thereof and one of its supporting bearings and resiliently holding said friction disk, pulley and friction cylinder in operative relations, substantially as described.

In testimony whereof I have signed my name to this specification in the presence of two subscribing witnesses.

DALLAS C. WOODWORTH.

Witnesses:
LAURENCE KRAMER,
CHAS. W. GINNANE.

Copies of this patent may be obtained for five cents each, by addressing the "Commissioner of Patents, Washington, D. C."